J. H. LE COMPTE.
NUT LOCK.
APPLICATION FILED SEPT. 9, 1913.
1,120,393.
Patented Dec. 8, 1914.
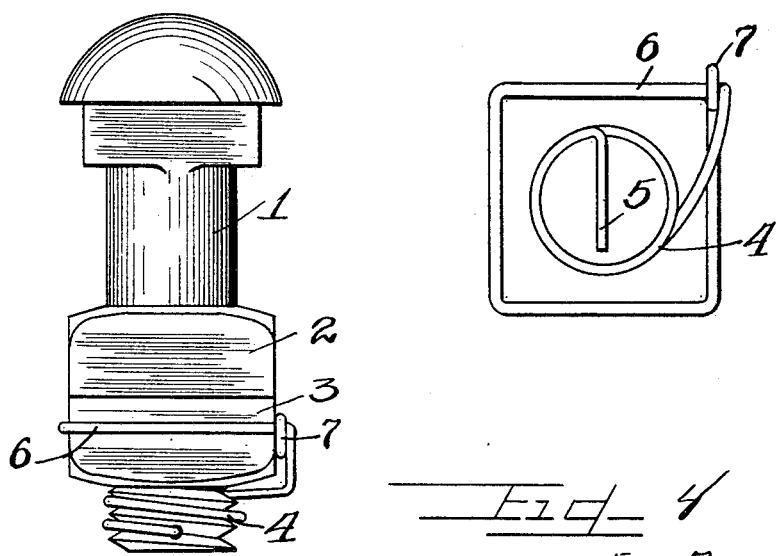
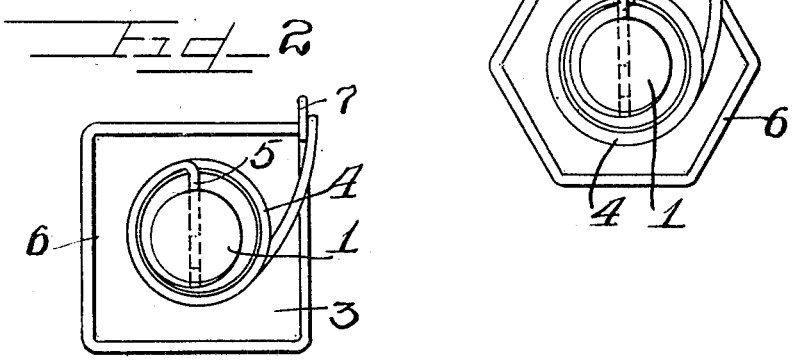
WITNESSES
Philip R. Hockenberger
Charles W. Field
INVENTOR
Joseph H. Le Compte.
By Charles W. Wills, Atty.

UNITED STATES PATENT OFFICE.

JOSEPH H. LE COMPTE, OF MAYWOOD, ILLINOIS, ASSIGNOR OF ONE-HALF TO GORHAM C. VARNEY, FIVE ONE-HUNDREDTHS TO EDWARD KOWALESKI, AND TEN ONE-HUNREDTHS TO MARTIN M. HEISLER, ALL OF CHICAGO, ILLINOIS.

NUT-LOCK.

1,120,393.      Specification of Letters Patent.      Patented Dec. 8, 1914.

Application filed September 9, 1913. Serial No. 788,947.

*To all whom it may concern:*

Be it known that I, JOSEPH H. LE COMPTE, a citizen of the United States, and a resident of the town of Maywood, in the county of Cook and State of Illinois, have invented certain new and useful Improvements in Nut-Locks; and I do hereby declare that the following is a full, clear, and exact description of the same, reference being had to the accompanying drawings, and to the numerals of reference marked thereon, which form a part of this specification.

Wherever bolts are subjected to vibration, it has proven difficult to maintain the nuts thereon adequately tight, such vibration tending to gradually rotate the nut and loosen the bolt. Because of this, many different types of nut locks have been devised, most of which are expensive to construct and install and to maintain in order, and some of which are difficult of application.

The object of this invention is to so secure a nut on a bolt as to maintain the same tight at all times.

It is also an object of this invention to apply a resilient nut lock to an ordinary nut and bolt to set the nut up on the bolt when vibration occurs.

The invention is capable of adaptation in many different forms, but in a preferred form is illustrated in the drawings and hereinafter more fully described.

In the drawings: Figure 1 is a side elevation of an ordinary splice bolt and nut, showing a jam nut in place and equipped with a nut lock embodying my invention. Fig. 2 is an end elevation thereof. Fig. 3 is a plan view of the resilient locking means showing the same removed from the nut and bolt. Fig. 4 is a view similar to Fig. 2, but illustrates the application of the device to a hexagonal nut.

As shown in the drawings: 1, indicates a splice bolt and 2, the nut thereon. 3, indicates a jam nut. The threaded end of the bolt, as shown, is provided with an aperture in the side thereof. The resilient locking means comprises a coiled spring 4, consisting of one or more turns of spring wire of suitable gage, one end 5, of which is bent transversely of the axis of the coil for engagement in the aperture in the bolt, and the other end 6, of which is bent or shaped to engage around the nut to be secured in place. If to be applied on an ordinary square nut, said end portion of the spring is bent to conform to the four sides of the nut, as illustrated in Figs. 1 to 3 inclusive; if to a hexagonal nut, said end of the spring is bent accordingly, as illustrated in Fig. 4. Preferably, the extremity of said end is provided with a loop or eye 7, to close the loop formed about the nut thereby and to positively secure said extremity in place.

The operation is as follows: After the bolt is in position, the nut 3, is set up firmly against the splice bar or the body in which the bolt is secured, or, if preferred, against a nut 2, should the lock nut be used as a jam nut, which, of course, is not necessary, and the spring is applied in place by engaging the end 5, in the aperture in the end of the bolt and slipping the looped or enlarged portion of the spring over the nut. Before engaging the nut, the spring is wound upon the bolt sufficiently to afford some tension, the draft of the spring being in a direction to thread the nut upon the bolt, as illustrated in Fig. 1. Any vibration of the bolt capable of effecting any movement whatever of the nut relative the bolt, causes the nut to thread onto the bolt, with the effect of constantly tightening the nut and maintaining at all times a very positive and secure engagement.

Of course, various details of the construction and application of said device may be modified, and it is to be understood that I do not purpose limiting the patent otherwise than necessitated by the appended claims.

I claim as my invention:

1. A nut locking device embracing a coiled spring, a bolt having an aperture therein, one end of said spring adapted to be engaged within the aperture of the bolt, said spring wound to correspond with and lie between the threads of said bolt, and the other end formed to afford a closed loop, adapted to conform to the outer surface of a nut.

2. In a device of the class described a coiled spring having one end bent transversely of the axis of the same and the other end bent or shaped to afford a relatively large closed loop.

In testimony whereof I have hereunto subscribed my name, in the presence of two subscribing witnesses.

JOSEPH H. LE COMPTE,

Witnesses:
CHARLES W. HILLS, Jr.,
LEON M. REIBSTEIN.